(12) United States Patent
Mizuguchi et al.

(10) Patent No.: US 6,605,915 B2
(45) Date of Patent: Aug. 12, 2003

(54) NUMERICAL CONTROL APPARATUS FOR MACHINE TOOL

(75) Inventors: Hiroshi Mizuguchi, Yamatokoriyama (JP); Masaaki Yokoyama, Yamatokoriyama (JP); Munetaka Wakizaka, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 68 days.

(21) Appl. No.: 09/987,581

(22) Filed: Nov. 15, 2001

(65) Prior Publication Data

US 2002/0060541 A1 May 23, 2002

(30) Foreign Application Priority Data

Nov. 22, 2000 (JP) ........................................ 2000-356298

(51) Int. Cl.[7] .............................................. B23B 19/02
(52) U.S. Cl. ........................ 318/569; 318/600; 318/632
(58) Field of Search ...................... 318/568.22, 568.23, 318/568.24, 569, 599, 600, 632, 646, 652, 671

(56) References Cited

U.S. PATENT DOCUMENTS

| | | | |
|---|---|---|---|
| 4,777,715 A | * | 10/1988 | Roberts |
| 4,884,482 A | * | 12/1989 | Council, Jr. |
| 5,184,053 A | * | 2/1993 | Maruo et al. ................ 318/571 |
| 6,293,703 B1 | * | 9/2001 | Date ........................... 384/476 |

FOREIGN PATENT DOCUMENTS

| | | |
|---|---|---|
| JP | 62-124805 | 6/1987 |
| JP | 2-279203 | 11/1990 |
| JP | 2000-084702 | 3/2000 |

* cited by examiner

Primary Examiner—Bentsu Ro
(74) Attorney, Agent, or Firm—Armstrong, Westerman & Hattori, LLP

(57) ABSTRACT

The present invention provides a numerical control apparatus for a machine tool, which corrects an axial displacement of a main spindle caused due to a change in preload level and occurring according to the rotation speed of the main spindle. The numerical control apparatus (3) comprises: a numerical control section (6) for numerically controlling the movement of a spindle head (2) and for outputting a rotation command; a spindle control section (7) for controlling the rotation of a main spindle (5); a preload change control section (8) for changing the level of a preload applied to bearings (36, 37); and a correcting section (9) for outputting correction data for correction of an axial displacement of the main spindle (5) caused due to a change in the preload level and occurring according to the rotation speed of the main spindle (5) to the numerical control section (6) on the basis of the rotation command.

3 Claims, 7 Drawing Sheets

F I G. 3

HIGHER PRELOAD LEVEL: DATA TABLE I

| ROTATION SPEED (min$^{-1}$) | CORRECTION DATA VALUE |
|---|---|
| 0 | 0 |
| 1000 | a1 |
| 2000 | a2 |
| 3000 | a3 |
| .... | .... |
| 13000 | a13 |

LOWER PRELOAD LEVEL: DATA TABLE II

| ROTATION SPEED (min$^{-1}$) | CORRECTION DATA VALUE |
|---|---|
| 0 | b1 |
| 14000 | b2 |
| 15000 | b3 |
| 16000 | b4 |
| .... | .... |
| 20000 | b8 |

NUMERICAL CONTROL APPARATUS FOR MACHINE TOOL

BACKGROUND OF THE INVENTION

1. Field of the Invention

The present invention relates to a numerical control apparatus for a machine tool having a spindle head which applies different levels of a preload to bearings rotatably supporting a main spindle in accordance with the rotation speed of the main spindle.

2. Description of the Prior Art

Machine tools typically have a main spindle which supports a tool for machining a workpiece, and the main spindle is rotatably supported by bearings (angular contact ball bearings). In such a machine tool, a preload is generally applied to the bearings when the main spindle (tool) is rotated for the machining of the workpiece. The preload is switchably set at different preload levels according to the rotation speed of the main spindle. More specifically, a greater preload (a higher level preload) is applied to the bearings to increase the rigidity and rotation accuracy of the main spindle when the main spindle is rotated at a lower rotation speed. When the main spindle is rotated at a higher rotation speed, on the other hand, a smaller preload (a lower level preload) is applied to the bearings for prevention of seizure of the bearings which may otherwise occur due to frictional heat.

Techniques for the switchable setting of the preload level are disclosed, for example, in Japanese Unexamined Patent Publications No. 62-124805 (1987) and No. 2-279203 (1990). With these techniques, the rotation speed of the main spindle is detected by a sensor or the like, and a hydraulic mechanism is driven on the basis of the detection of the sensor, whereby the level of the preload to be applied to the bearings is switchably set according to the rotation speed. However, the main spindle is liable to be axially displaced when the preload level is changed. Therefore, the relative position of the main spindle (tool) with respect to the workpiece is changed by the change in the preload level. This disadvantageously reduces the machining accuracy.

One approach to this problem is to correct the displacement of the main spindle caused due to the change in the preload level as proposed in Japanese Unexamined Patent Publication No. 2000-84702. A spindle unit disclosed in Japanese Unexamined Patent Publication No. 2000-84702 includes non-contact displacement detection means for detecting an axial displacement of the main spindle, and movement correction means for correcting axial movement of the main spindle on the basis of the axial displacement detected by the non-contact displacement detection means when the level of the preload to be applied to the bearings is changed.

However, the spindle unit cannot correct a displacement of the main spindle occurring in accordance with the rotation speed of the main spindle, though being capable of correcting the displacement of the main spindle caused due to the change in the preload level. When the main spindle is rotated for the machining of the workpiece, the main spindle is radially expanded and axially contracted due to a centrifugal force exerted thereon, so that the position of a distal end of the main spindle is changed. Therefore, the displacement of the main spindle varies depending on the rotation speed of the main spindle. That is, the displacement becomes more remarkable, as the rotation speed increases. Unless the displacement of the main spindle occurring in accordance with the rotation speed of the main spindle is corrected, the relative position of the main spindle (tool) with respect to the workpiece is changed depending on the rotation speed. This results in reduction in machining accuracy.

It is therefore an object of the present invention to provide a numerical control apparatus for a machine tool, which is capable of correcting an axial displacement of a main spindle caused due to a change in preload level as well as an axial displacement of the main spindle occurring in accordance with the rotation speed of the main spindle.

SUMMARY OF THE INVENTION

A numerical control apparatus according to the present invention is used with a machine tool having a spindle head which applies different levels of a preload to a bearing rotatably supporting a main spindle in accordance with the rotation speed of the main spindle, and adapted to numerically control the movement of the spindle head. The numerical control apparatus comprises: a numerical control section for numerically controlling the movement of the spindle head; a spindle control section for controlling the rotation of the main spindle on the basis of a rotation command from the numerical control section; a preload change control section for changing the level of the preload to be applied to the bearing in accordance with the rotation speed of the main spindle on the basis of the rotation command from the numerical control section; and a correcting section for outputting correction data for correction of an axial displacement of the main spindle caused due to a change in the preload level and an axial displacement of the main spindle occurring in accordance with the rotation speed of the main spindle to the numerical control section on the basis of the rotation command from the numerical control section, wherein the numerical control section corrects the axial displacement of the main spindle occurring in accordance with the rotation speed of the main spindle and the axial displacement of the main spindle caused due to the change in the preload level on the basis of the correction data.

In the numerical control apparatus, axial displacements of the main spindle occurring at different preload levels and at different rotation speeds are preliminarily measured, and correction data values for the different preload levels and the different rotation speeds are stored in the correcting section. Then, the correcting section retrieves a correction data value on the basis of the rotation command from the numerical control section, and outputs the correction data value as the correction data to the numerical control section. The numerical control section corrects the axial displacement of the main spindle caused due to the change in the preload level and the displacement of the main spindle occurring in accordance with the rotation speed on the basis of the correction data value. The preload change control section judges whether the level of the preload to be applied to the bearing is to be changed on the basis of the rotation command from the numerical control section and, if necessary, changes the preload level.

Thus, the inventive numerical control apparatus can correct the axial displacement of the main spindle caused due to the change in the preload level as well as the axial displacement of the main spindle occurring in accordance with the rotation speed, so that the machine tool has an improved machining accuracy.

BRIEF DESCRIPTION OF THE DRAWINGS

FIG. 3 is a diagram illustrating data tables stored in a data table storage section in FIG. 1;

DETAILED DESCRIPTION OF THE PREFERRED EMBODIMENT

A numerical control apparatus for a machine tool according to the present invention will be described with reference to the attached drawings. The inventive numerical control apparatus is adapted to switchably set the level of a preload to be applied to bearings rotatably supporting a main spindle when the main spindle is rotated for machining a workpiece. When the main spindle is rotated at a lower rotation speed, e.g., at a rotation speed of 0 to 13,000 $min^{-1}$, a higher level preload is applied to the bearings. When the main spindle is rotated at a higher rotation speed, e.g., at a rotation speed of 14,000 to 20,000 $min^{-1}$, a lower level preload is applied to the bearings. The preload level is changed at a spindle rotation speed of 13,000 to 14,000 $min^{-1}$, e.g., at 13,500 $min^{-1}$. The numerical control apparatus is adapted to correct an axial displacement of the main spindle caused due to the change in the preload level and an axial displacement of the main spindle occurring in accordance with the rotation speed for improvement of the machining accuracy.

Figure 1:
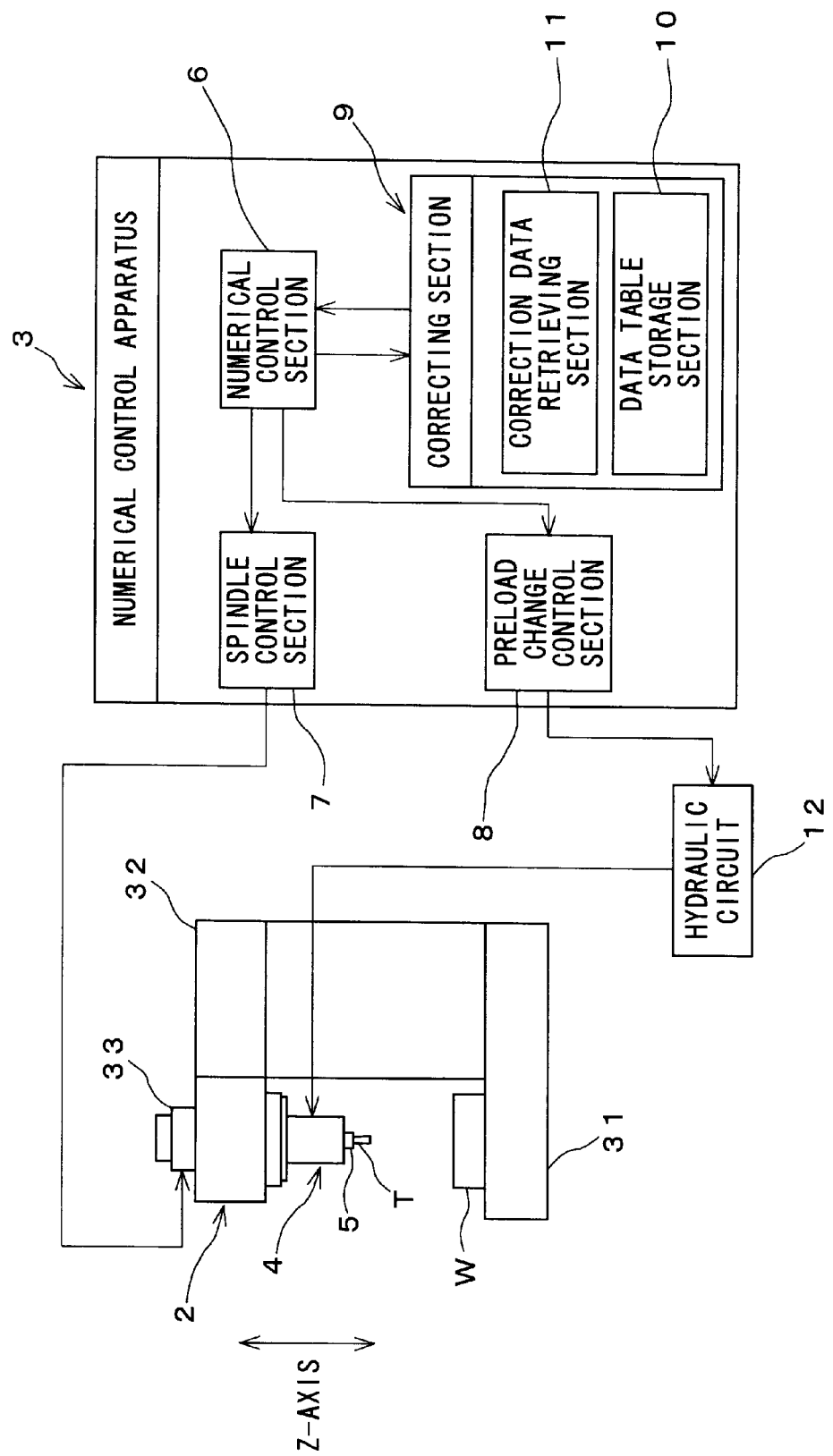
FIG. 1 is a schematic diagram illustrating the construction of a machine tool in accordance with an embodiment of the present invention.

A numerical control apparatus for a machine tool according to one embodiment of the present invention will hereinafter be described with reference to FIGS. 1 to 7. FIG. 1 is a block diagram schematically illustrating the construction of the machine tool, and FIG. 2 is a sectional view illustrating the construction of a spindle unit 4.

In FIG. 1, the machine tool 1 is a vertical machining center, and includes a spindle head 2, a numerical control apparatus 3 and the like. The spindle head 2 is attached to a column 32 provided on a bed 31, and is adapted to be moved along the Z-axis by rolling guide means. The spindle head 2 includes a spindle unit 4 for holding a tool T for machining a workpiece W, and the spindle unit 4 is connected to a motor 33. The spindle unit 4 has a construction as shown in FIG. 2.

Figure 2:
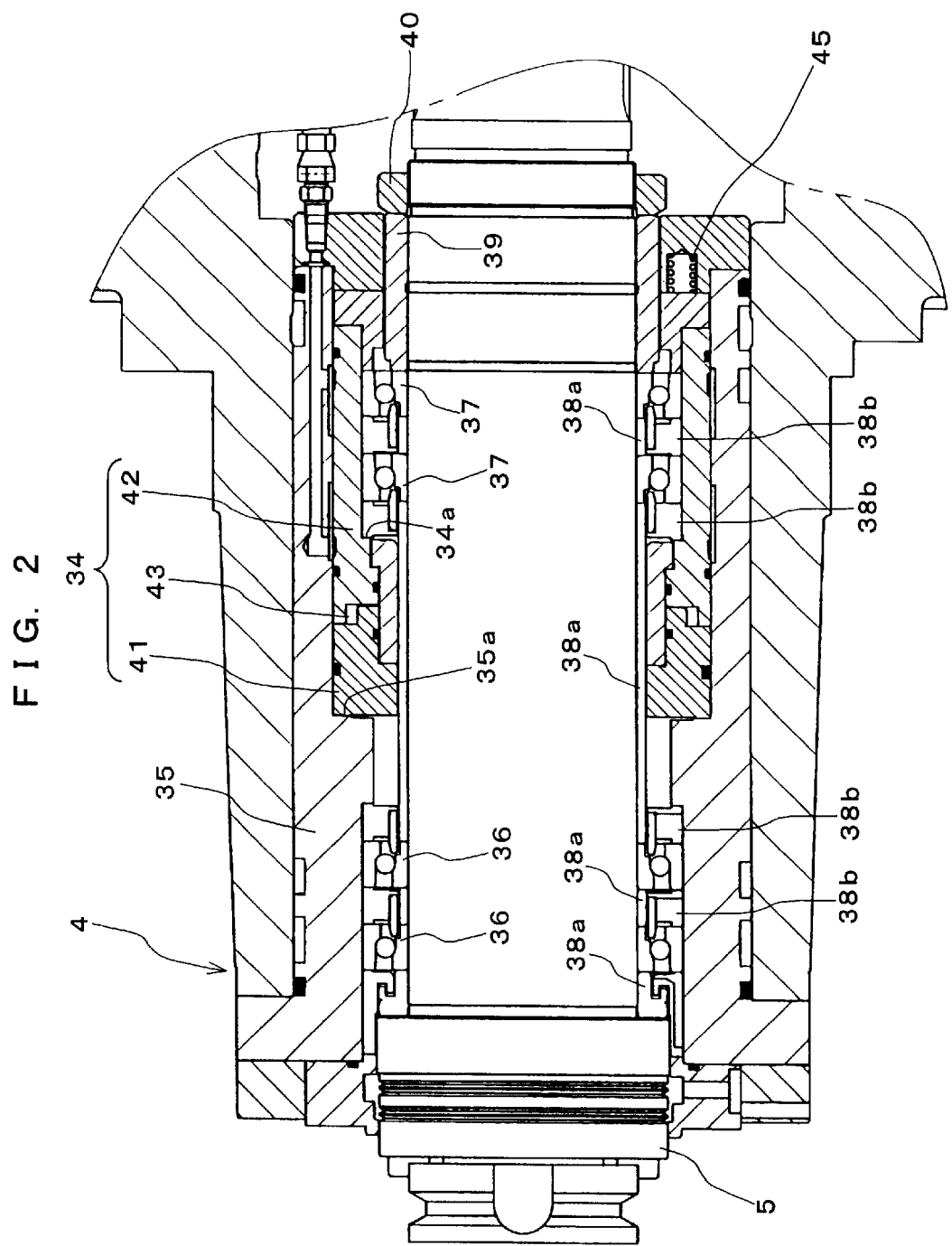
FIG. 2 is a sectional view illustrating the construction of a spindle unit in FIG. 1.

As shown in FIG. 2, the spindle unit 4 includes a main spindle 5 for holding the tool T, and a hydraulic mechanism 34 for changing a preload level. The main spindle 5 is rotatably supported within a housing 35 via a plurality of bearings 36, 37. The main spindle 5 is coupled to the motor 33 (see FIG. 1), and is adapted to be rotated by driving the motor 33. The bearings 36 and 37 are respectively provided at forward and rearward positions within the housing 35, and each include two bearings (herein after referred to as "front bearings 36" and "rear bearings 37"). The bearings 36, 37 are positioned by a plurality of inner ring spacers 38a and outer ring spacers 38b. A lower level preload is usually applied to the respective bearings 36, 37 by a preload sleeve 39 and a preload nut 40. The preload sleeve 39 is fitted around the main spindle 5 at a rear end of the housing 35 and abuts against the rear bearings 37. The preload nut 40 is threadingly fitted around the main spindle 5 on the rear side of the preload sleeve 39. The preload nut 40 is rotated to axially slide the preload sleeve 39, whereby the lower level preload is applied directly to the rear bearings 37, and to the front bearings 36 via the inner ring spacers 38a. The hydraulic mechanism 34 is provided between the front and rear bearings 36 and 37, and includes a ring member 41 and a movable sleeve 42. The ring member 41 is fitted around the main spindle 5 within the housing 35. The ring member 41 abuts against an intermediate step 35a formed in the inner periphery of the housing 35 for positioning thereof. The movable sleeve 42 is provided between the ring member 41 and the rear bearings 37, and fitted around the main spindle 5. The movable sleeve 42 is slidable with respect to the inner periphery of the housing 35 with a sealing member interposed therebetween, and a hydraulic chamber 43 is defined between the ring member 41 and the movable sleeve 42. The hydraulic chamber 43 is connected to a hydraulic circuit 12 (see FIG. 1), and a working fluid is fed into and out of the hydraulic chamber 43. The movable sleeve 42 has a step 34a on the inner periphery thereof with the inner diameter thereof being greater on the side of the rear bearings 37, and the inner peripheral step 34a abuts against the outer ring spacer 38b of the rear bearing 37. The hydraulic mechanism 34 is adapted to axially slide the movable sleeve 42 by introducing the working fluid into the hydraulic chamber 43. Thus, the movable sleeve 42 presses the rear bearings 37 via the outer ring spacers 38b, whereby the preload to be applied to the rear bearings 37 is changed from a lower preload level to a higher preload level. The action of the movable sleeve 42 is transmitted to the front bearings 36 via the preload sleeve 39, the preload nut 40, the main spindle 5 and the inner ring spacers 38a, so that the preload to be applied to the front bearings 36 is also changed from the lower preload level to the higher preload level. When the working fluid is discharged from the hydraulic chamber 43 of the hydraulic mechanism 34, on the other hand, the movable sleeve 42 is slid away from the rear bearings 37 by a spring force of a return spring 45, whereby the preload to be applied to the respective bearings 36, 37 is changed from the higher preload level to the lower preload level.

As shown in FIG. 1, the numerical control apparatus 3 includes a numerical control section 6, a spindle control section 7, a preload change control section 8, and a correcting section 9. The numerical control section 6 is adapted to control the movement of the spindle head 2 and the like on the basis of NC programs, and output a command signal to the spindle control section 7, the preload change control section 8 and the correcting section 9. The spindle control section 7 is adapted to control the driving of the motor 33 on the basis of the command signal (rotation speed signal) from the numerical control section 6 to rotate the main spindle 5 at a rotation speed specified by the command signal. The preload change control section 8 is adapted to judge whether the preload level is to be changed on the basis of the command signal (rotation speed signal) from the numerical control section 6, and control the operation of the hydraulic circuit 12, whereby the working fluid is fed into and out of the hydraulic chamber 43 of the hydraulic mechanism 34 shown in FIG. 2.

As shown in FIG. 1, the correcting section 9 is adapted to retrieve a correction data value for correction of the axial displacement of the main spindle 5 on the basis of the command signal (rotation speed signal) from the numerical control section 6, and output the correction data value as the correction data to the numerical control section 6. The correcting section 9 has a data table storage section 10 and a correction data retrieving section 11. It is noted that the axial displacement of the main spindle 5 occurs along the Z-axis along which the spindle head 2 is moved.

As shown in FIG. 1, the data table storage section 10 stores therein correction data values for the correction of the axial displacement of the main spindle 5 caused due to the change in the preload level and the axial displacement of the main spindle 5 occurring in accordance with the rotation speed of the main spindle 5. The data table storage section 10 has data tables I and II as shown in FIG. 3. As shown in FIG. 3, the data table I contains correction data values to be employed when the main spindle is rotated at lower rotation speeds (0 to 13,000 min$^{-1}$) under application of the higher level preload, for example, contains correction data values a1 to a13 for lower rotation speeds in increments of 1,000 min$^{-1}$. The data table II contains correction data values to be employed when the main spindle is rotated at higher rotation speeds (14,000 to 20,000 min$^{-1}$) under application of the lower level preload, for example, contains correction data values b1 to b8 for higher rotation speeds in increments of 1,000 min$^{-1}$. The respective correction data values a1 to a13 and b1 to b8 are correlated with axial displacements of the main spindle 5 preliminarily measured at the different preload levels and at the different rotation speeds.

Figure 4:
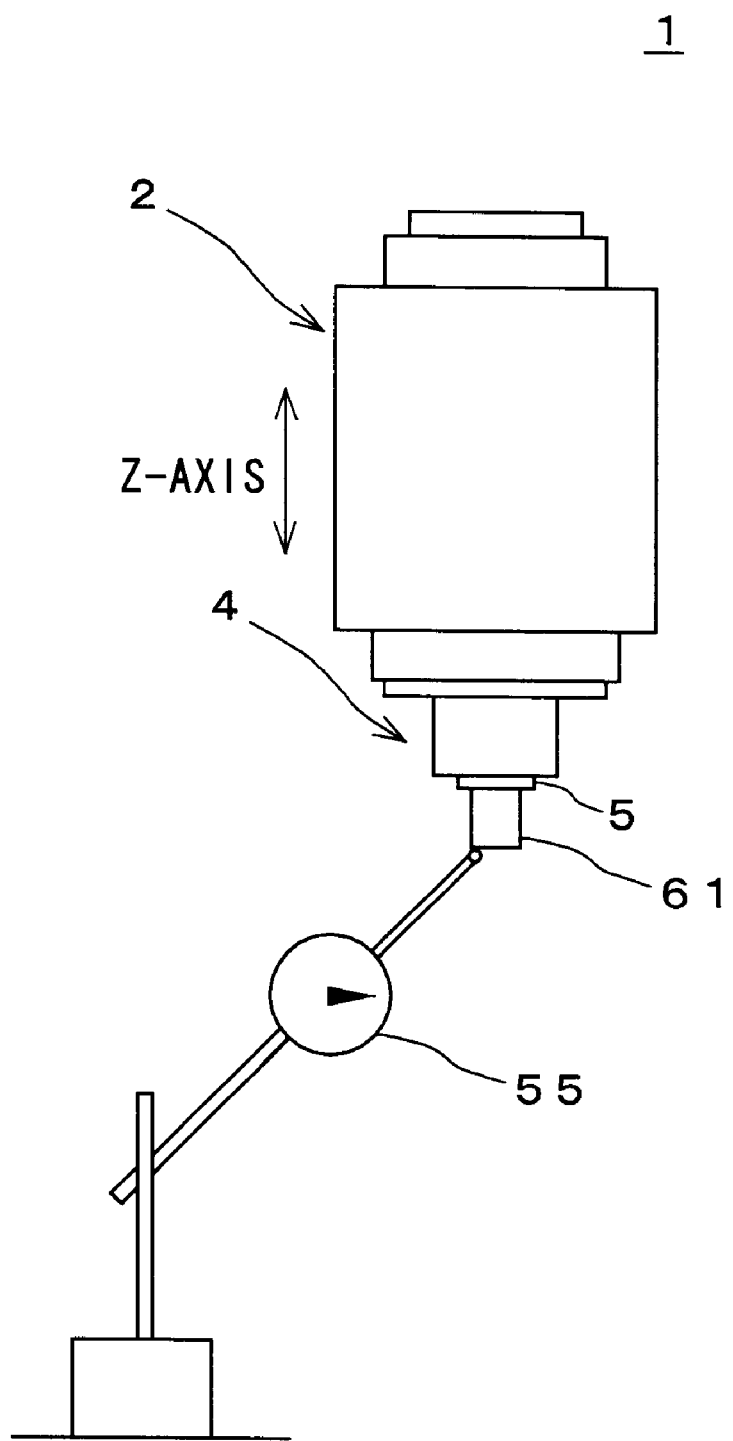
FIG. 4 is an enlarged diagram for explaining how to determine a displacement of a main spindle.
Figure 5:
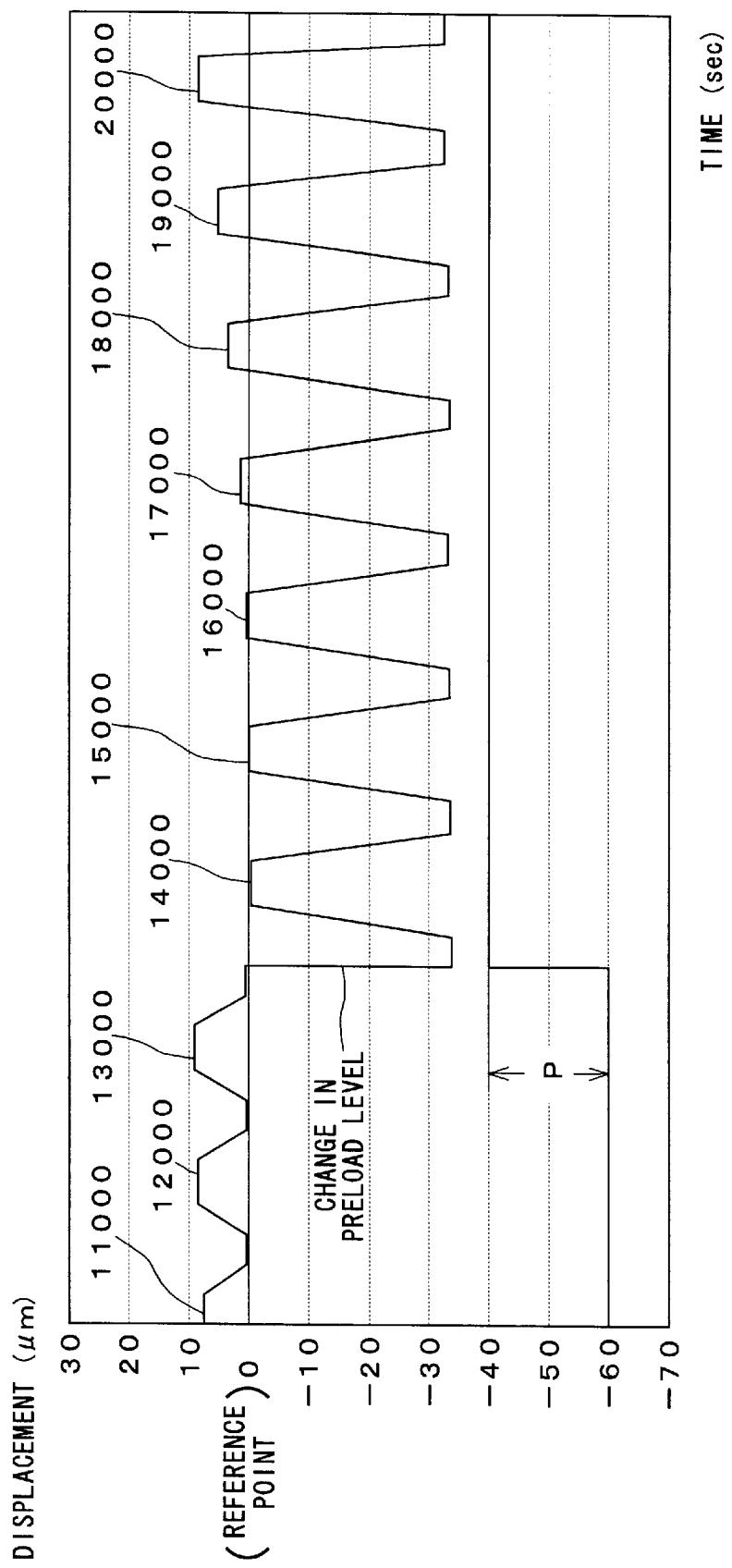
FIG. 5 is a graph illustrating the result of the measurement of the displacement of the main spindle.

For the determination of the correction data values a1 to a13, for example, a pickup indicator 55 is brought into contact with a distal end of a test tool 61 attached to the main spindle 5, as shown in FIG. 4, with the higher level preload being applied to the bearings 36, 37 and with the rotation speed of the main spindle 5 being zero. In this state, the position of the main spindle 5 with no displacement is defined as a reference point C, and the axial displacement of the main spindle 5 (along the Z-axis) is measured under the application of the higher level preload while the main spindle 5 is rotated at a rotation speed which is incremented by 1,000 min$^{-1}$ within a lower rotation speed range (from 0 to 13,000 min$^{-1}$). For the determination of the correction data values b1 to b8, the preload is changed from the higher preload level to the lower preload level with the rotation speed of the main spindle 5 being zero. In this state, the axial displacement of the main spindle 5 (along the Z-axis) is measured under the application of the lower level preload while the main spindle 5 is rotated at a rotation speed which is incremented by 1,000 min$^{-1}$ within a higher rotation speed range (from 14,000 to 20,000 min$^{-1}$). When the preload is changed to the lower preload level, the displacement is preliminarily corrected by an initial correction amount P (e.g., 20 μm). The results of the measurement are shown in FIG. 5, which illustrates a relationship between the rotation speed of the main spindle 5 and the displacement. The correction data values a1 to a13 and b1 to b8 are each indicative of a displacement of the main spindle 5 with respect to the reference point C. As is apparent from FIG. 5, the correction data values a1 to a13 and b1 to b8 are determined for the displacements with respect to the reference point C and, therefore, the displacement of the main spindle 5 at each of the rotation speeds is corrected so that the main spindle 5 is positioned at the reference point C. The correction data values b1 to b8 are each indicative of a displacement of the main spindle 5 occurring in accordance of the rotation speed (14,000 to 20,000 min$^{-1}$) after the preload is changed to the lower preload level, so that the displacement of the main spindle 5 caused due to the change in the preload level and the displacement of the main spindle 5 occurring in accordance with the rotation speed are corrected.

As shown in FIG. 1, the correction data retrieving section 11 is adapted to retrieve a correction data value from the data table storage section 10 on the basis of the command signal (rotation speed signal) from the numerical control section 6, and output the correction data value as the correction data to the numerical control section 6. Thus, the numerical control section 6 corrects the axial displacement of the main spindle 5 on the basis of the correction data value.

Figure 6:
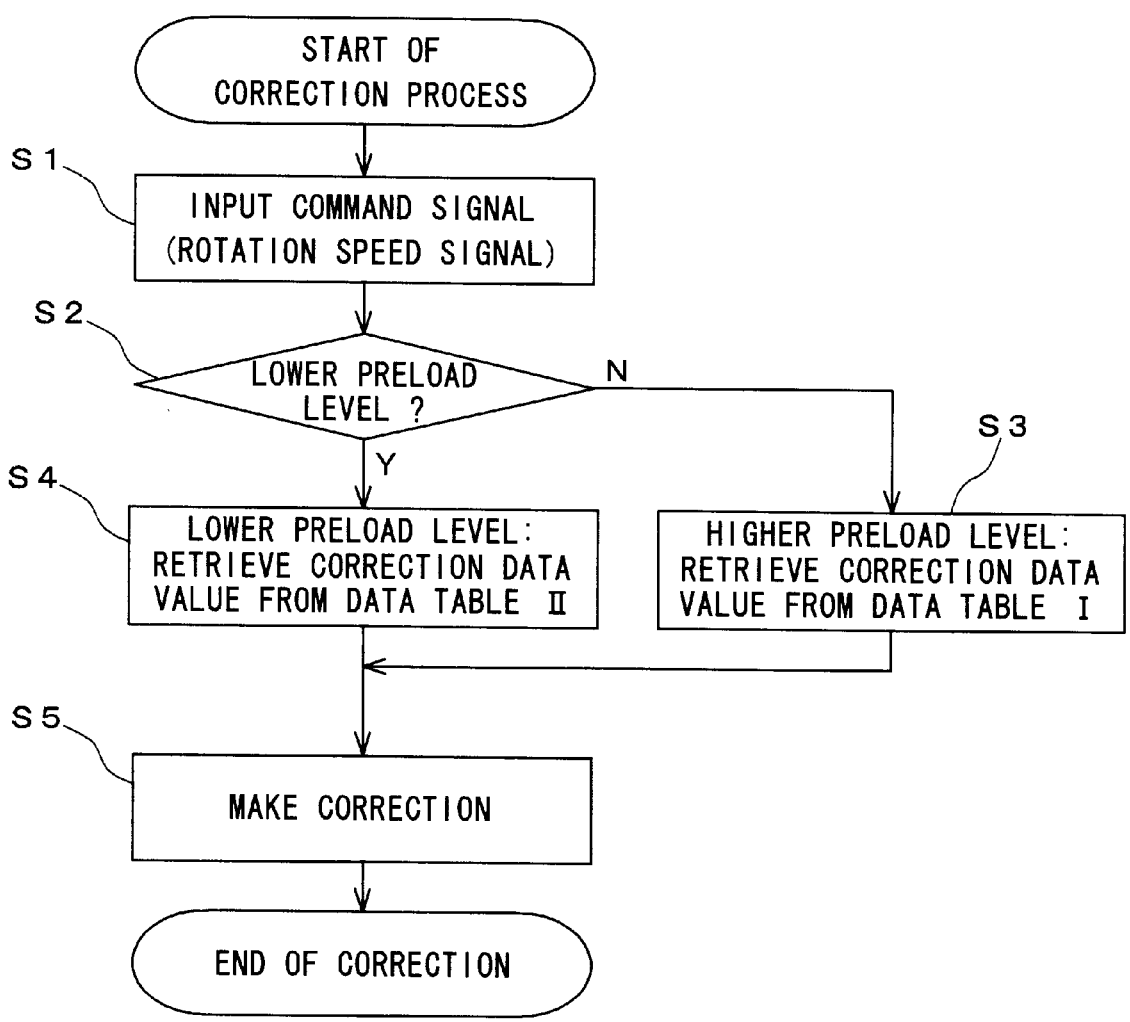
FIG. 6 is a flow chart for explaining a correction process.
Figure 7:
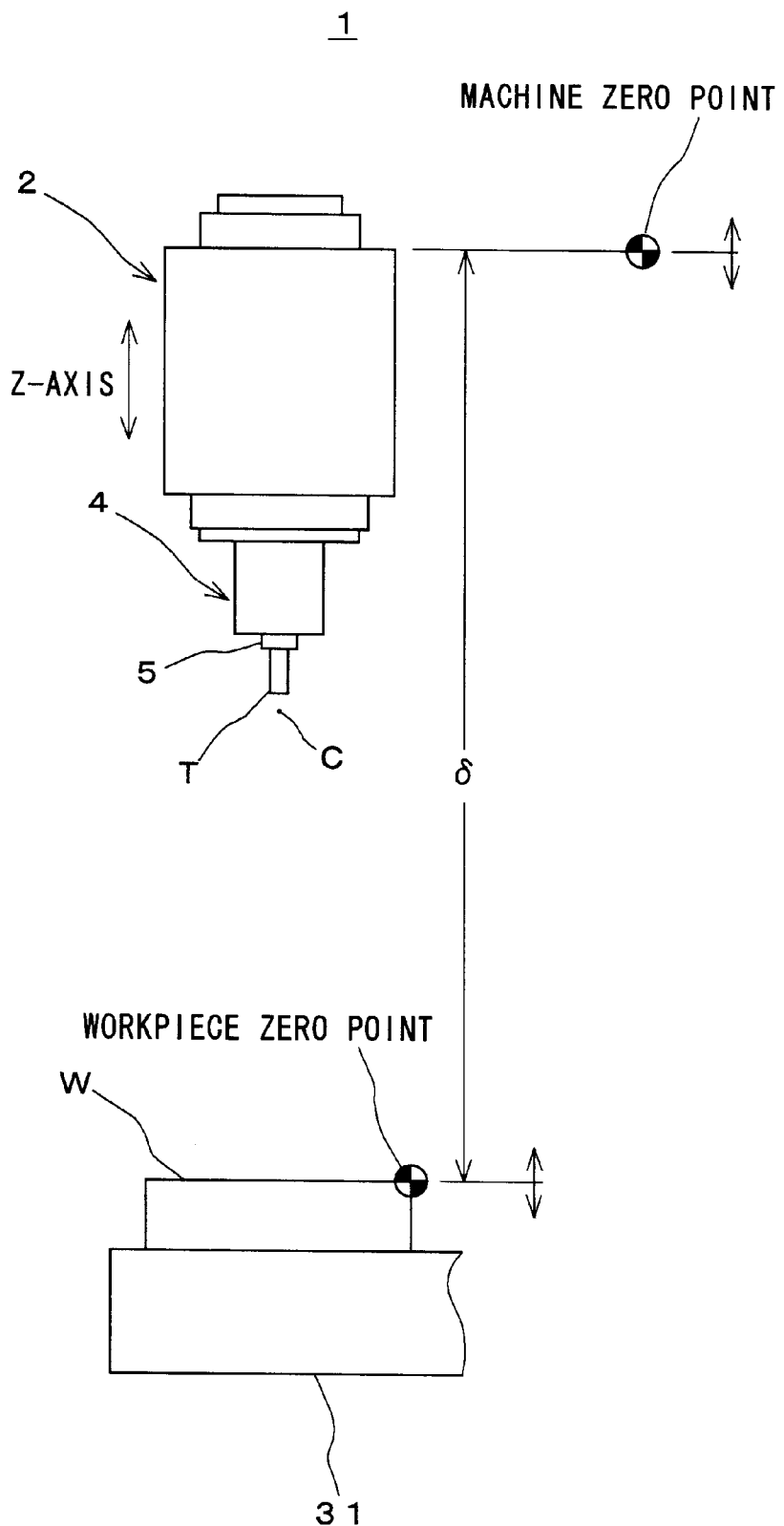
FIG. 7 is an enlarged diagram for explaining reference points for the correction.

With reference to FIGS. 6 and 7, an explanation will next be given to a correction process to be performed by the numerical control apparatus in the machine tool. FIG. 6 is a flow chart for explaining the correction process, and FIG. 7 is an enlarged diagram for explaining correction reference points. As shown in FIG. 2, it is assumed that the lower level preload is currently applied to the bearings 36, 37 by the preload nut 40.

As shown in FIG. 1, the machine tool 1 starts the machining by executing the NC programs stored in the numerical control apparatus 3. The numerical control section 6 outputs a command signal to the spindle control section 7, the preload change control section 8 and the correcting section 9 on the basis of the NC programs. The spindle control section 7 controls the driving of the motor 33 on the basis of the command signal (rotation speed signal) to rotate the main spindle 5 at a rotation speed specified by the command signal. The preload change control section 8 judges whether the preload level is to be changed on the basis of the command signal (rotation speed signal) and, if necessary, controls the operation of the hydraulic circuit 12, whereby the working fluid is introduced into the hydraulic chamber 43 of the hydraulic mechanism 34 shown in FIG. 2. As shown in FIG. 2, the movable sleeve 42 is axially slid by the introduction of the working fluid to change the preload to be applied to the respective bearings 36, 37 from the lower preload level to the higher preload level.

At the same time, the numerical control apparatus 3 performs the correction process (Steps S1 to S5) shown in FIG. 6. Upon reception of the rotation speed signal inputted from the numerical control section 6, the correcting section 9 determines the preload level on the basis of the rotation speed signal in Step S1. If the preload is at the higher preload level in Step S2, the correction data retrieving section 11 retrieves a correction data value according to the rotation speed signal from the data table I (for the higher preload level) in the data table storage section 10 shown in FIG. 3. If the rotation speed of the main spindle 5 is 13,000 min$^{-1}$, for example, a correction data value a13 is selected from the data table I (Step S3). If the preload is at the lower preload level in Step S2, the correction data retrieving section 11 retrieves a correction data value according to the rotation speed signal from the data table II (for the lower preload level) in the data table storage section 10 shown in FIG. 3. If the rotation speed of the main spindle is 20,000 min$^{-1}$, for example, a correction data value b8 is selected from the data table I (Step S4).

Then, the correcting section 9 outputs the correction data value a13 (or b8) to the numerical control section 6, and the numerical control section 6 corrects the axial displacement of the main spindle 5 along the Z-axis on the basis of the correction data value a13 (or b8). As shown in FIG. 7, the correction is made by shifting a machine zero point or a workpiece zero point prescribed in the NC programs by the correction data value a13 (or b8) in the numerical control section 6. Thus, the displacement of the main spindle 5 occurring in accordance with the rotation speed and the displacement of the main spindle 5 caused due to the change in the preload level are corrected, so that the main spindle 5 is positioned at the reference point C (Step S5).

When the main spindle 5 reaches the rotation speed specified by the rotation speed signal, the numerical control section 6 moves the spindle head 2 along the Z-axis on the basis of the NC programs to machine a workpiece W by means of the tool T. Further, the numerical control section 6 outputs a rotation speed signal to the preload change control section 8. The preload change control section 8 judges whether the preload level is to be changed on the basis of the rotation speed signal and, if necessary, stops the operation of the hydraulic circuit 12, whereby the working fluid is discharged from the hydraulic chamber 43 of the hydraulic mechanism 34 shown in FIG. 2. Thus, the movable sleeve 42 is slid by a spring force of the return spring 45, whereby the preload to be applied to the respective bearings 36, 37 is changed from the higher preload level to the lower preload level.

Since the numerical control apparatus for the machine tool in accordance with the aforesaid embodiment of the present invention can thus correct the axial displacement of the main spindle 5 caused due to the change in the preload level and the axial displacement of the main spindle 5 occurring in accordance with the rotation speed, the machine tool has an improved machining accuracy.

The present invention is not limited to the numerical control apparatus according to the aforesaid embodiment shown in FIGS. 1 to 7, but may be embodied in the following ways.

(1) The correction data values b2 to b8 stored in the data table storage section 10 are not limited to those indicative of the displacements of the main spindle 5 with respect to the reference point C. For example, the correction data values b2 to b8 may be determined in the following manner. First, a difference between the correction data values b2 and b8 (f=b8−b2) is calculated, and then divided by six to provide a proportional factor g=f/6. The correction data values for the respective rotation speeds are each determined as N×g (N=1,2,3, . . . ) which is proportional to the rotation speed. That is, b1=g, b2=2×g, b3=3×g, . . . are employed as the correction data values.

(2) In the embodiment described above, the preload is changed between the higher preload level and the lower preload level, but may be changed among three preload levels, e.g., a high preload level, an intermediate preload level and a low preload level.

(3) The rotation speed at which the preload level is changed is not limited to 13,500 min$^{-1}$, but may properly be selected depending on the size of the bearings 36, 37. Further, the range of the rotation speed of the main spindle is not limited to 0 to 20,000 min$^{-1}$.

(4) The correction of the axial displacement of the main spindle 5 may be made not only by shifting the machine zero point or the workpiece zero point, but also by increasing or reducing a correction amount δ on the basis of the correction data as shown in FIG. 7. The correction amount δ herein means a distance by which the spindle head 2 (the tool T of the main spindle 5) is moved from the machine zero point to the workpiece W.

(5) When the displacement of the main spindle 5 is determined under the application of the lower level preload, the displacement is not necessarily required

What is claimed is:

1. For use with a machine tool having a spindle head which applies different levels of a preload to a bearing rotatably supporting a main spindle in accordance with a rotation speed of the main spindle, a numerical control apparatus for numerically controlling movement of the spindle head, comprising:

a numerical control section for numerically controlling the movement of the spindle head;

a spindle control section for controlling rotation of the main spindle on the basis of a rotation command from the numerical control section;

a preload change control section for changing the level of the preload to be applied to the bearing in accordance with the rotation speed of the main spindle on the basis of the rotation command from the numerical control section; and a correcting section for outputting correction data for correction of an axial displacement of the main spindle caused due to a change in the preload level and an axial displacement of the main spindle occurring in accordance with the rotation speed of the main spindle to the numerical control section on the basis of the rotation command from the numerical control section, wherein the numerical control section corrects the axial displacement of the main spindle occurring in accordance with the rotation speed of the main spindle and the axial displacement of the main spindle caused due to the change in the preload level on the basis of the correction data.

2. A numerical control apparatus as set forth in claim 1, further comprising:

a storage section for storing therein correction data values preliminarily determined for axial displacements of the main spindle occurring at different preload levels and at different rotation speeds, wherein the correcting section reads out a correction data value as the correction data from the storage section in accordance with the preload level and the rotation speed of the main spindle, and outputs the correction data value to the numerical control section.

3. A numerical control apparatus as set forth in claim 2, wherein the correction data values are stored in the form of a data table in the storage section.

* * * * *